(12) United States Patent
Yin et al.

(10) Patent No.: US 11,767,628 B2
(45) Date of Patent: Sep. 26, 2023

(54) CLOTHING TREATMENT DEVICE AND CONTROL METHOD THEREFOR

(71) Applicants: QINGDAO HAIER WASHING MACHINE CO., LTD., Shandong (CN); HAIER SMART HOME CO., LTD., Shandong (CN)

(72) Inventors: Junming Yin, Shandong (CN); Zhenxing Huang, Shandong (CN); Sheng Xu, Shandong (CN)

(73) Assignees: QINGDAO HAIER WASHING MACHINE CO., LTD., Shandong (CN); HAIER SMART HOME CO., LTD., Shandong (CN)

( * ) Notice: Subject to any disclaimer, the term of this patent is extended or adjusted under 35 U.S.C. 154(b) by 176 days.

(21) Appl. No.: 17/604,627

(22) PCT Filed: Apr. 1, 2020

(86) PCT No.: PCT/CN2020/082793
§ 371 (c)(1),
(2) Date: Oct. 18, 2021

(87) PCT Pub. No.: WO2020/211648
PCT Pub. Date: Oct. 22, 2020

(65) Prior Publication Data
US 2022/0195651 A1 Jun. 23, 2022

(30) Foreign Application Priority Data
Apr. 17, 2019 (CN) .......................... 201910308699.0

(51) Int. Cl.
*D06F 34/05* (2020.01)
*D06F 34/28* (2020.01)
*G06K 7/10* (2006.01)

(52) U.S. Cl.
CPC .............. *D06F 34/05* (2020.02); *D06F 34/28* (2020.02); *G06K 7/10366* (2013.01)

(58) Field of Classification Search
CPC ...................................................... D06F 34/05
See application file for complete search history.

(56) References Cited

U.S. PATENT DOCUMENTS 6,897,778 B1    5/2005   Borlenghi

FOREIGN PATENT DOCUMENTS

CN           1384955 A       12/2002
CN         109537236 A        3/2019
(Continued)

OTHER PUBLICATIONS

International Search Report (PCT/ISA/210) with translation and Written Opinion (PCT/ISA/237) dated Jun. 30, 2020, by the Chinese Patent Office as the International Searching Authority for International Application No. PCT/CN2020/082793. (9 pages).

*Primary Examiner* — Jason Y Ko
(74) *Attorney, Agent, or Firm* — BUCHANAN INGERSOLL & ROONEY PC

(57) ABSTRACT

A clothing treatment device comprises a tag excitation apparatus, and the tag excitation apparatus is used for transmitting an excitation signal to excite an electronic tag on clothing, to generate a tag signal that can be obtained by a signal base station. The tag excitation apparatus and an NB-iot module are added on the clothing treatment device. The tag excitation apparatus is only used for transmitting the excitation signal, and a reading module is not provided. The tag signal generated by the electronic tag is obtained by the signal base station nearby, and the signal base station forwards the obtained tag signal to a corresponding clothing treatment device by means of a cellular mobile communication network.

18 Claims, 1 Drawing Sheet

(56) References Cited

FOREIGN PATENT DOCUMENTS

| | | |
|---|---|---|
| CN | 109594298 A | 4/2019 |
| DE | 102008044122 A1 | 6/2010 |
| JP | 2019048133 A | 3/2019 |
| KR | 20100026859 A | 3/2010 |

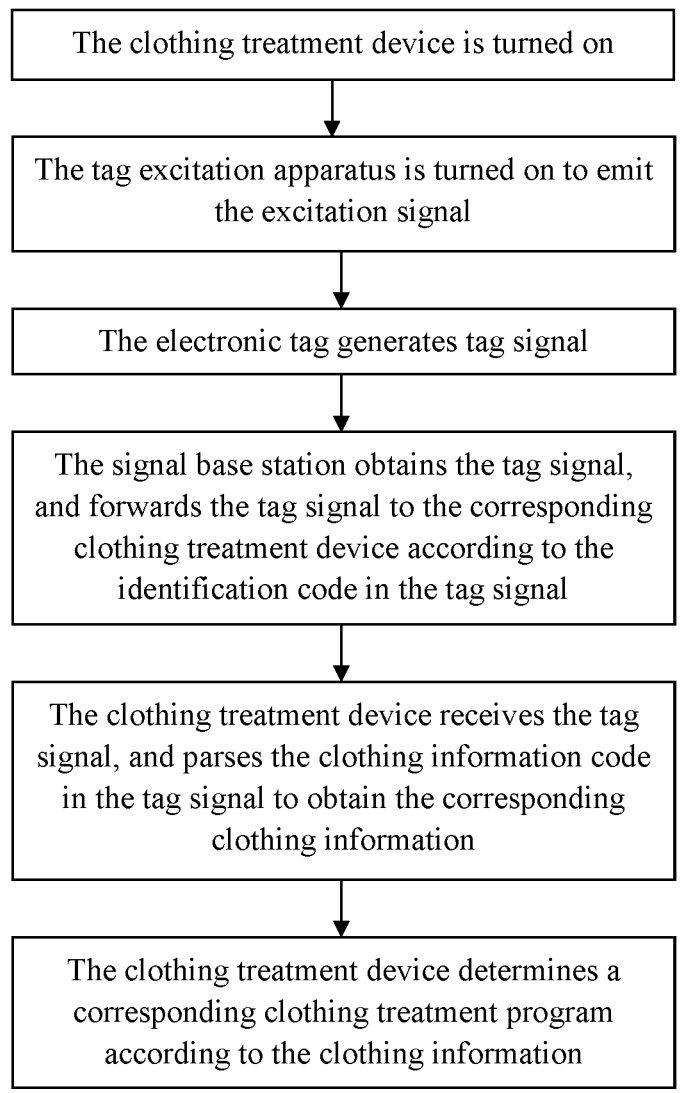

CLOTHING TREATMENT DEVICE AND CONTROL METHOD THEREFOR

TECHNICAL FIELD

The present disclosure relates to the technical field of household appliances, and particularly herein relates to a clothing treatment device and a control method therefor.

BACKGROUND

With the development and progress of new technologies, the clothing treatment device, such as washing machines, dryers, washer-dryers and other equipment have been equipped with new technologies to achieve more intelligent control. For example, the current washing machine has the function of clothing identification, such as, the washing machine is equipped with a clothing identification module: RFID module. The washing machine with RFID clothing identification function, in which the RFID identification module is integrated with an antenna and a reader, it causes the cost of the washing machine module to be relatively high. It is difficult to achieve technology promotion on ordinary machines.

The Chinese patent with application number 201510829777.3 discloses a method for controlling a washing machine and a washing machine. The method for controlling the washing machine includes that when the user starts the washing machine to wash the clothes, the clothes identification module scans the clothes identification tags set on the laundry to obtain the clothes identification information; the clothing identification module sends clothing identification information to the controller, so that the controller controls the washing machine to perform laundry washing according to the washing program corresponding to the clothing identification information in the washing program library. Through the present invention, the washing machine can accurately obtain the clothing identification information in the process of washing the clothes, so as to wash the clothes according to the corresponding washing program, and effectively improve the washing effect of the washing machine. The washing machine is equipped with an RFID reader to read the radio frequency signal of the electronic tag. However, each washing machine needs to install the RFID reader, which undoubtedly increases the cost of the washing machine and is not conducive to the promotion of technology.

In view of this, the disclosure is proposed.

SUMMARY

The technical problem to be solved by the disclosure is to overcome the shortcomings of the prior art and provide a clothing treatment device. A tag excitation apparatus and an NB-iot module are added on the clothing treatment device. The tag excitation apparatus is only used for transmitting the excitation signal, and a reading module is not provided. The tag signal generated by the electronic tag is obtained by the signal base station nearby, and the signal base station forwards the obtained tag signal to a corresponding clothing treatment device by means of a cellular mobile communication network, such that the reading module is not required to be provided on each clothing treatment device, so that the costs for a clothing identification technology to be applied to a washing machine and a clothes dryer greatly decrease, facilitating the popularization of the clothing identification technology in the clothing treatment device.

In order to solve the technical problem above, the basic idea of the technical scheme adopted by the disclosure is:

A clothing treatment device, it comprises a tag excitation apparatus, and the tag excitation apparatus is configured to transmit an excitation signal to excite an electronic tag on clothing, so that the electronic tag generates a tag signal that can be obtained by a signal base station.

In the above scheme, a tag excitation apparatus is added on the clothing treatment device. The tag excitation apparatus is only used for transmitting the excitation signal, and a reading module is not provided. The tag signal generated by the electronic tag is obtained by the signal base station nearby, such that the reading module is not required to be provided on each clothing treatment device, so that the costs for a clothing identification technology to be applied to a washing machine and a clothes dryer greatly decrease, facilitating the popularization of the clothing identification technology in the clothing treatment device.

The RFID module of the existing washing machine is designed with an antenna and a reader integrated. The antenna sends an electromagnetic signal to the RFID tag, and the RFID tag receives the electromagnetic signal through electromagnetic coupling. The chip in the tag will be excited, and the stored information will be sent out through the tag antenna. Each time a tag is excited, its own tag information will be emitted. The electromagnetic signal from the tag is transmitted to the RFID reader via the antenna of the RFID module, decoded by the reader, and sent to the washing machine controller. Compared with the traditional RFID system structure, the present disclosure only reserves the antenna part, and the reader part will be replaced by the base station. In order to make the electronic tag generate electromagnetic signals with more energy, the power of the excitation device can be increased to allow the tag to obtain more energy, and the signal base station as a reading device has a reading ability that is unmatched by ordinary readers, so as to realize the long-distance signal reading.

Preferably, the clothing treatment device is provided with a communication module, and the clothing treatment device is communication connected with the signal base station through the communication module, and receives the tag signal send by the signal base station.

The clothing treatment device is provided with the communication module, and the corresponding tag signal is obtained by the signal base station to form a direct and complete signal loop.

Preferably, the communication module is a NB-iot module, and the clothing treatment device is auto connected to the signal base station via NB-iot module.

In the above scheme, the communication module is the NB-iot module. The NB-iot is built on a cellular network and only consumes about 180 KHz of bandwidth. It can be directly deployed on the GSM network, UMTS network or LTE network to reduce deployment costs and achieve smooth upgrades. And NB-iot focuses on the Low Power Consumption Wide Coverage (LPWA) Internet of Things (IOT) market and is an emerging technology that can be widely used worldwide. It has the characteristics of wide coverage, multiple connections, low speed, low cost, low power consumption, and excellent architecture. NB-iot uses the License frequency band and can adopt three deployment methods: in-band, guard band, or independent carrier, to coexist with existing networks. NB-iot is an emerging technology in the IoT field, which supports the cellular data connection of low-power devices in the wide area network. It is also called low-power wide area network (LPWAN).

NB-iot supports efficient connection of devices with long standby time and high network connection requirements. NB-iot devices have a long battery life and at the same time provide very comprehensive indoor cellular data connection coverage.

Preferably, a plurality of clothing treatment device are communication connected with the signal base station, and each clothing treatment device is provided with a tag excitation apparatus.

In the above scheme, a plurality of clothing treatment device are communication connected to the same signal base station, and each clothing treatment device shares the same signal base station. Therefore, the module cost is saved for each clothing treatment device.

Another object of the present disclosure is to provide a control method of the clothing treatment device, and the clothing treatment device comprises a tag excitation apparatus, the control method comprises: the tag excitation apparatus transmitting an excitation signal to excite an electronic tag on clothing, so that the electronic tag generates a tag signal and send it to the signal base station.

Preferably, the clothing treatment device is communication connected with the signal base station, and the tag signal is obtained by the signal base station.

Preferably, the clothing treatment device comprises a cellular mobile communication module, and the clothing treatment device is connected to the established cellular mobile communication network through the cellular mobile communication network, and communication connected with the signal base station through the cellular mobile communication network.

Preferably, the tag signal has a identification code, and the clothing treatment device is connected to the signal base station to obtain the tag signal corresponding to the identification code.

In the above scheme, the tag signal generated by the electronic tag includes the identification code, and the identification code corresponds to the clothing treatment device. After the clothing treatment device is connected to the signal base station, the signal base station obtains the tag signal with the corresponding identification code.

Preferably, a plurality of clothing treatment device are provided with the tag excitation apparatus, and the tag excitation apparatus of each clothing treatment device writes the corresponding identification code to the electronic tag. The electronic tag generates a tag signal with identification code after inducing the excitation signal, and the clothing treatment device obtains the tag signal with the corresponding identification code from the signal base station.

In the above scheme, the tag excitation apparatus of each clothing treatment device writes the corresponding identification code to the electronic tag, so that the clothing treatment device obtains the tag signal with the corresponding identification code from the signal base station. Or to put it another way, after the signal base station obtains the tag signals of the clothing electronic tags of different clothing treatment device, it sends the tag signals to the corresponding clothing treatment device according to the identification code in each tag signal.

Preferably, the tag signal includes clothing information code, and the clothing treatment device parses the clothing information code according to the set analysis rules to obtain the corresponding clothing information.

In the above scheme, the signal is analyzed and processed at the washing machine side, and the clothing treatment device determines the corresponding clothing treatment program according to the analyzed clothing information.

In another embodiment, the clothing treatment device is communication connected with the cloud server, and the cloud server is communication connected with the signal base station, after the cloud server obtains the tag signal from the signal base station, it performs analysis and processing to obtain clothing information, the clothing treatment device connects to the cloud server to obtain the clothing information.

Further preferably, the cloud server determines the corresponding clothing treatment program according to the parsed clothing information, and the clothing treatment device is connected to the cloud server to obtain the clothing treatment program.

After adopting the above technical scheme, the disclosure has the following beneficial effects compared with the prior art:

The clothing treatment device comprises a tag excitation apparatus, and the tag excitation apparatus is used for transmitting an excitation signal to excite an electronic tag on clothing, so that the electronic tag generates a tag signal that can be obtained by a signal base station. The tag excitation apparatus and an NB-iot module are added on the clothing treatment device. The tag excitation apparatus is only used for transmitting the excitation signal, and a reading module is not provided. The tag signal generated by the electronic tag is obtained by the signal base station nearby, and the signal base station forwards the obtained tag signal to a corresponding clothing treatment device by means of a cellular mobile communication network, such that the reading module is not required to be provided on each clothing treatment device, so that the costs for a clothing identification technology to be applied to a washing machine and a clothes dryer greatly decrease, facilitating the popularization of the clothing identification technology in the clothing treatment device.

The implementation of the disclosure will be described in further detail with reference to the attached FIGURES.

BRIEF DESCRIPTION OF THE DRAWINGS

As a part of the disclosure, the attached drawings are used to provide a further understanding of the disclosure. The embodiments and descriptions of the disclosure are used to explain the disclosure and is not to be considered as improper limitation of the disclosure. Obviously, the following drawings are only some embodiments. For the person skilled in the art, other drawings can be obtained according to these drawings without any creative work. In the attached FIGURES:

FIG. 1 is a preferred control step of the clothing treatment device of the disclosure.

It should be noted that these drawings and descriptions are not to limit the conception of the disclosure in any way, but to illustrate the concept of the disclosure for the person skilled in the art by referring to specific embodiments.

DETAILED DESCRIPTION

The technical scheme in the following embodiments will then be described clearly and completely with combination with the attached FIGURES in order to make the purpose, technical scheme and advantages of the disclosure clearer. The following embodiments are used to illustrate the disclosure but are not used to limit the scope of the disclosure.

In the following description, it should be noted that the terms "up", "down", "front", "back", "left", "right", "vertical", "inside", "outside" and etc. are based on the directions or positions shown in the attached FIGURES. They are used to simplify the description, rather than to indicate that the device or element referred must have a specific direction or to be constructed or operated in a specific direction.

And in the following description, it should be understood that the terms "installment" and "connection" should be treated according to generalized understanding. For example, they can be understood as fixed connection, detachable connection or integrated connection. Also, they can mean mechanical connection or electrical connection. They can also represent direct connection or indirect connection. The person skilled in the art are able to understand the specific meaning of the above terms in the disclosure according to the specific situation.

Embodiment 1

This embodiment provides a clothing treatment device, and the clothing treatment device comprises a tag excitation apparatus, and the tag excitation apparatus is used for transmitting an excitation signal to excite an electronic tag on clothing, so that the electronic tag generates a tag signal that can be obtained by a signal base station. A tag excitation apparatus is added on the clothing treatment device. The tag excitation apparatus is only used for transmitting the excitation signal, and a reading module is not provided. The tag signal generated by the electronic tag is obtained by the signal base station nearby, such that the reading module is not required to be provided on each clothing treatment device, so that the costs for a clothing identification technology to be applied to a washing machine and a clothes dryer greatly decrease, facilitating the popularization of the clothing identification technology in the clothing treatment device.

The RFID module of the washing machine is designed with an antenna and a reader integrated. The antenna sends an electromagnetic signal to the RFID tag, and the RFID tag receives the electromagnetic signal through electromagnetic coupling. The chip in the tag will be excited, and the stored information will be sent out through the tag antenna. Each time a tag is excited, its own tag information will be emitted. The electromagnetic signal from the tag is transmitted to the RFID reader via the antenna of the RFID module, decoded by the reader, and sent to the washing machine controller. Compared with the traditional RFID system structure, the solution of this application only reserves the antenna part, and the reader part will be replaced by the base station. In order to make the electronic tag generate electromagnetic signals with more energy, the power of the excitation device can be increased to allow the tag to obtain more energy, and the signal base station as a reading device has a reading ability that is unmatched by ordinary readers, so as to realize the long-distance signal reading.

In this embodiment, the washing machine is provided with only the tag excitation apparatus, the cost of its module will be greatly reduced than before, which will help the promotion of RFID clothing recognition function, and the signal base station is a data collection device, if the clothing treatment device wants to obtain the signal base station data, it must connect to the base station. The clothing treatment device is provided with a communication module, and the clothing treatment device is communication connected with the signal base station through the communication module, and receives the tag signal send by the signal base station. The clothing treatment device is provided with a communication module, and the tag signal is obtained by a signal base station to form a direct and complete signal loop.

In addition to WiFi, the existing wireless module is NB-iot, and the NB-iot module is also called narrowband internet of things. And the communication module is NB-iot module, and the clothing treatment device is auto connected to the signal base station by NB-iot module.

NB-iot module is based on cellular network, the communication module uses the NB-iot module. The NB-iot is built on a cellular network and only consumes about 180 KHz of bandwidth. It can be directly deployed on the GSM network, UMTS network or LTE network to reduce deployment costs and achieve smooth upgrades. And NB-iot focuses on the Low Power Consumption Wide Coverage (LPWA) Internet of Things (IoT) market and is an emerging technology that can be widely used worldwide. It has the characteristics of wide coverage, multiple connections, low speed, low cost, low power consumption, and excellent architecture. NB-iot uses the license frequency band and can adopt three deployment methods: in-band, guard band, or independent carrier, to coexist with existing networks. NB-iot supports the cellular data connection of low-power devices in the wide area network. It is also called low-power wide area network. NB-iot supports efficient connection of devices with long standby time and high network connection requirements. NB-iot devices have a long battery life and at the same time provide very comprehensive indoor cellular data connection coverage.

Preferably, a plurality of clothing treatment device are communication connected with the signal base station, and each clothing treatment device is provided with the tag excitation apparatus. And a plurality of clothing treatment device are communication connected to the same signal base station, and each clothing treatment device shares the same signal base station. Therefore, the module cost is saved for each clothing treatment device.

The tag excitation apparatus is installed inside the clothing treatment device, and the excitation signal range of the tag excitation apparatus is smaller than the range of the tag signal generated after the electronic tag is excited.

In order to prevent misidentification after receiving the instruction to turn on the recognition, the clothing treatment device judges whether the conditions for turning on the tag excitation apparatus are met. If the judgment result is yes, the tag excitation apparatus is controlled to turn on the emission excitation signal, otherwise the tag excitation apparatus is controlled to turn off.

The clothing treatment device judges whether the conditions for turning on the tag excitation apparatus are met, including judging whether the door is closed and judging whether the start button of the laundry treatment equipment is triggered. If both of the judgment results are yes, the clothing treatment device controls the tag excitation apparatus to turn on and emit the excitation signal, otherwise, it controls the tag excitation apparatus to turn off. In this way, it is prevented that when the door is opened, the excitation signal will stimulate the electronic tags on the clothes outside the door. And when the door is not closed, it is possible that the user has not put all the clothes into the clothing treatment device. At this time, if the tag excitation apparatus is controlled to be turned on, the electronic tags on the clothes worn by the human body will also be excited.

Embodiment 2

The present embodiment provides a control method applied to the above-mentioned clothing treatment device, the clothing treatment device comprises a tag excitation apparatus, the control method comprises: the tag excitation apparatus transmitting an excitation signal to excite an electronic tag on clothing, so that the electronic tag generates a tag signal and send it to the signal base station.

The clothing treatment device is communication connected with the signal base station, and the tag signal is obtained by the signal base station.

The clothing treatment device comprises a cellular mobile communication module, and the clothing treatment device is connected to the established cellular mobile communication network through the cellular mobile communication network, and communication connected with the signal base station through the cellular mobile communication network. After the washing machine is turned on, it is directly connected to the cellular mobile communication network to realize the connection with the signal base station.

The tag signal generated after the electronic tag is excited has an identification code, and the clothing treatment device is connected to the signal base station to obtain the tag signal corresponding to the identification code. The tag signal generated by the electronic tag includes an identification code, and the identification code corresponds to the clothing treatment device. After the clothing treatment device is connected to the signal base station, the signal base station obtains the tag signal with the corresponding identification code.

A plurality of clothing treatment device are provided with tag excitation apparatus, and the tag excitation apparatus of each clothing treatment device writes the corresponding identification code to the electronic tag. The electronic tag generates a tag signal with identification code after inducing the excitation signal, and the clothing treatment device obtains the tag signal with the corresponding identification code from the signal base station. The tag excitation apparatus of each clothing treatment device writes the corresponding identification code to the electronic tag, so that the clothing treatment device obtains the tag signal with the corresponding identification code from the signal base station. Or to put it another way, after the signal base station obtains the tag signals of the clothing electronic tags of different clothing treatment device, it sends the tag signals to the corresponding clothing treatment device according to the identification code in each tag signal.

Embodiment 3

In this embodiment, the tag signal generated after the electronic tag is excited has clothing information code, and the clothing processing device parses the clothing information code according to the set analysis rule to obtain corresponding clothing information. The clothing treatment device has an analysis function, the clothing treatment device analyzes and processes the received tag signal, and the clothing treatment device determines the corresponding clothing treatment program according to the parsed clothing information. Or determine the parameter value of the clothing treatment program according to the parsed clothing information.

Referring to FIG. 1, the preferred control method of this embodiment is provided, specifically:

S1、The clothing treatment device being turned on;
S2、The tag excitation apparatus being turned on to emit the excitation signal;
S3、The electronic tag generating the tag signal;
S4、The signal base station obtaining the tag signal, and forwarding the tag signal to the corresponding clothing treatment device according to the identification code in the tag signal;
S5、The clothing treatment device receiving the tag signal, and parsing the clothing information code in the tag signal to obtain the corresponding clothing information;
S6、The clothing treatment device determining a corresponding clothing treatment program according to the clothing information.

In another embodiment, the signal base station has an analysis function. After the signal base station receives the tag signal, it parses out the clothing information according to the set rules, and sends the parsed clothing information directly to the clothing treatment device. And the clothing treatment device performs a corresponding clothes treatment program matching process according to the clothes information.

Embodiment 4

In this embodiment, the clothing treatment device comprises a tag excitation apparatus, and the clothing treatment device is communication connected with the cloud server, and the cloud server is communication connected with the signal base station, after the cloud server obtains the tag signal from the signal base station, it performs analysis and processing to obtain clothing information, the clothing treatment device connects to the cloud server to obtain the clothing information.

Further preferably, the cloud server determines the corresponding clothing treatment program according to the parsed clothing information, and the clothing treatment device is connected to the cloud server to obtain the clothing treatment program.

The above description is just used to illustrate some more practical embodiments of the disclosure but is not the limitation of the disclosure in any way. Although the disclosure has been enclosed as the above embodiments, they are not used to limit the disclosure. Within the technical scheme of the disclosure, any person skilled in the art should be able to make some changes or modifications based on the above techniques to obtain other embodiments with equal benefits. But any simple changes, equivalent changes or modifications, made to the above embodiments according to the technical substance within the technical scheme of the disclosure, still belong to the protection range of the disclosure.

The invention claimed is:

1. A clothing treatment device comprising:
a tag excitation apparatus; wherein,
the tag excitation apparatus is configured to transmit an excitation signal to excite an electronic tag on clothing, and the electronic tag generates a tag signal that can be obtained by a signal base station.

2. The clothing treatment device according to claim 1, wherein,
a communication module is provided;
the clothing treatment device is communicatively connected with the signal base station through the communication module, and receives the tag signal sent by the signal base station.

3. The clothing treatment device according to claim 1, wherein,
a plurality of the clothing treatment devices are communicatively connected with the signal base station, and each clothing treatment device is provided with a tag excitation apparatus.

4. A control method of the clothing treatment device, and the clothing treatment device comprises a tag excitation apparatus, wherein:

the control method comprises: the tag excitation apparatus transmitting an excitation signal to excite an electronic tag on clothing, and the electronic tag generates a tag signal and send the tag signal to a signal base station.

5. The control method of the clothing treatment device according to claim 4, wherein:
the clothing treatment device is communicatively connected with the signal base station, and the tag signal is obtained by the signal base station.

6. The control method of the clothing treatment device according to claim 5, wherein:
the clothing treatment device comprises a cellular mobile communication module;
the clothing treatment device is connected to an established cellular mobile communication network through a cellular mobile communication network, and communicatively connected with the signal base station through the cellular mobile communication network.

7. The control method of the clothing treatment device according to claim 4, wherein:
the tag signal has an identification code;
the clothing treatment device is connected to the signal base station to obtain the tag signal corresponding to the identification code.

8. The control method of the clothing treatment device according to claim 7, wherein:
a plurality of clothing treatment devices are provided with the tag excitation apparatus;
the tag excitation apparatus of each clothing treatment device writes the corresponding identification code to the electronic tag;
the electronic tag generates the tag signal with identification code after inducing the excitation signal;
the clothing treatment device obtains the tag signal with the corresponding identification code from the signal base station.

9. The control method of the clothing treatment device according to claim 4, wherein:
the tag signal includes a clothing information code;
the clothing treatment device parses the clothing information code according to a set of analysis rules to obtain the corresponding clothing information.

10. The control method of the clothing treatment device according to claim 4, wherein:
the clothing treatment device is communicatively connected with a cloud server;
the cloud server is communicatively connected with the signal base station, after the cloud server obtains the tag signal from the signal base station, it performs analysis and processing to obtain clothing information;
the clothing treatment device connects to the cloud server to obtain the clothing information.

11. The clothing treatment device according to claim 2, wherein,
the communication module is an NB-iot module, and the clothing treatment device is auto connected to the signal base station via the NB-iot module.

12. The clothing treatment device according to claim 2, wherein,
a plurality of clothing treatment devices are communicatively connected with the signal base station, and each the clothing treatment device is provided with a tag excitation apparatus.

13. The control method of the clothing treatment device according to claim 5, wherein:
the tag signal has an identification code;
the clothing treatment device is connected to the signal base station to obtain the tag signal corresponding to the identification code.

14. The control method of the clothing treatment device according to claim 6, wherein:
the tag signal has an identification code;
the clothing treatment device is connected to the signal base station to obtain the tag signal corresponding to the identification code.

15. The control method of the clothing treatment device according to claim 9, wherein:
the clothing treatment device determines a corresponding clothing treatment program according to parsed clothing information.

16. The control method of the clothing treatment device according to claim 5, wherein:
the tag signal includes a clothing information code;
the clothing treatment device parses the clothing information code according to a set of analysis rules to obtain the corresponding clothing information.

17. The control method of the clothing treatment device according to claim 6, wherein:
the tag signal includes a clothing information code;
the clothing treatment device parses the clothing information code according to a set of analysis rules to obtain the corresponding clothing information.

18. The control method of the clothing treatment device according to claim 10, wherein:
the cloud server determines a corresponding clothing treatment program according to parsed clothing information, and the clothing treatment device is connected to the cloud server to obtain the clothing treatment program.

* * * * *